United States Patent [19]

Streit

[11] 4,185,424

[45] Jan. 29, 1980

[54] MOLDED PLASTIC STAKE

[75] Inventor: Kenneth F. Streit, Mt. Prospect, Ill.

[73] Assignee: Phone-Ducs, Inc., West Chicago, Ill.

[21] Appl. No.: 885,533

[22] Filed: Mar. 13, 1978

[51] Int. Cl.² .................. G01C 15/02; G01C 15/04
[52] U.S. Cl. .................. 52/103 R; 52/153; 52/154; 52/155; 119/121; 135/15 PE
[58] Field of Search .............. 119/121; 52/103, 153, 52/154, 155; 135/15 PE

[56] References Cited

U.S. PATENT DOCUMENTS

| | | | |
|---|---|---|---|
| 291,569 | 1/1884 | Borner | 52/155 |
| 531,196 | 12/1894 | Longton | 52/154 |
| 1,092,036 | 3/1914 | Fry | 119/121 |
| 1,308,939 | 7/1919 | Eggleston | 52/155 |
| 1,362,852 | 12/1920 | Dabis | 52/155 |
| 2,154,966 | 4/1939 | Vanderveer | 52/103 |
| 2,501,407 | 3/1950 | Olsen et al. | 52/155 |
| 3,066,447 | 12/1962 | Reiterer et al. | 52/155 |
| 3,456,660 | 7/1969 | Borchardt | 135/15 PE |
| 3,754,360 | 8/1973 | Herr | 135/15 PE |
| 3,788,336 | 1/1974 | Steffes | 135/15 PE |

FOREIGN PATENT DOCUMENTS 1802 of 1870 United Kingdom ............... 135/15 PE

*Primary Examiner*—J. C. Cannon
*Attorney, Agent, or Firm*—Dressler, Goldsmith, Clement, Gordon & Shore, Ltd.

[57] ABSTRACT

A one-piece molded plastic stake includes a slender elongate body formed of four integral webs which taper inwardly from a rounded striking surface at the trailing end of the stake to an intermediate point of the stake where the webs extend outwardly to provide a shoulder to resist pullout, once the stake has been driven into the ground. The webs taper inwardy from the outer ends of the outwardly extending portions and merge at a point at the leading end of the stake. Reinforcing portions are provided between the webs at the trailing end of the stake and provide for an enlarged striking area.

8 Claims, 6 Drawing Figures

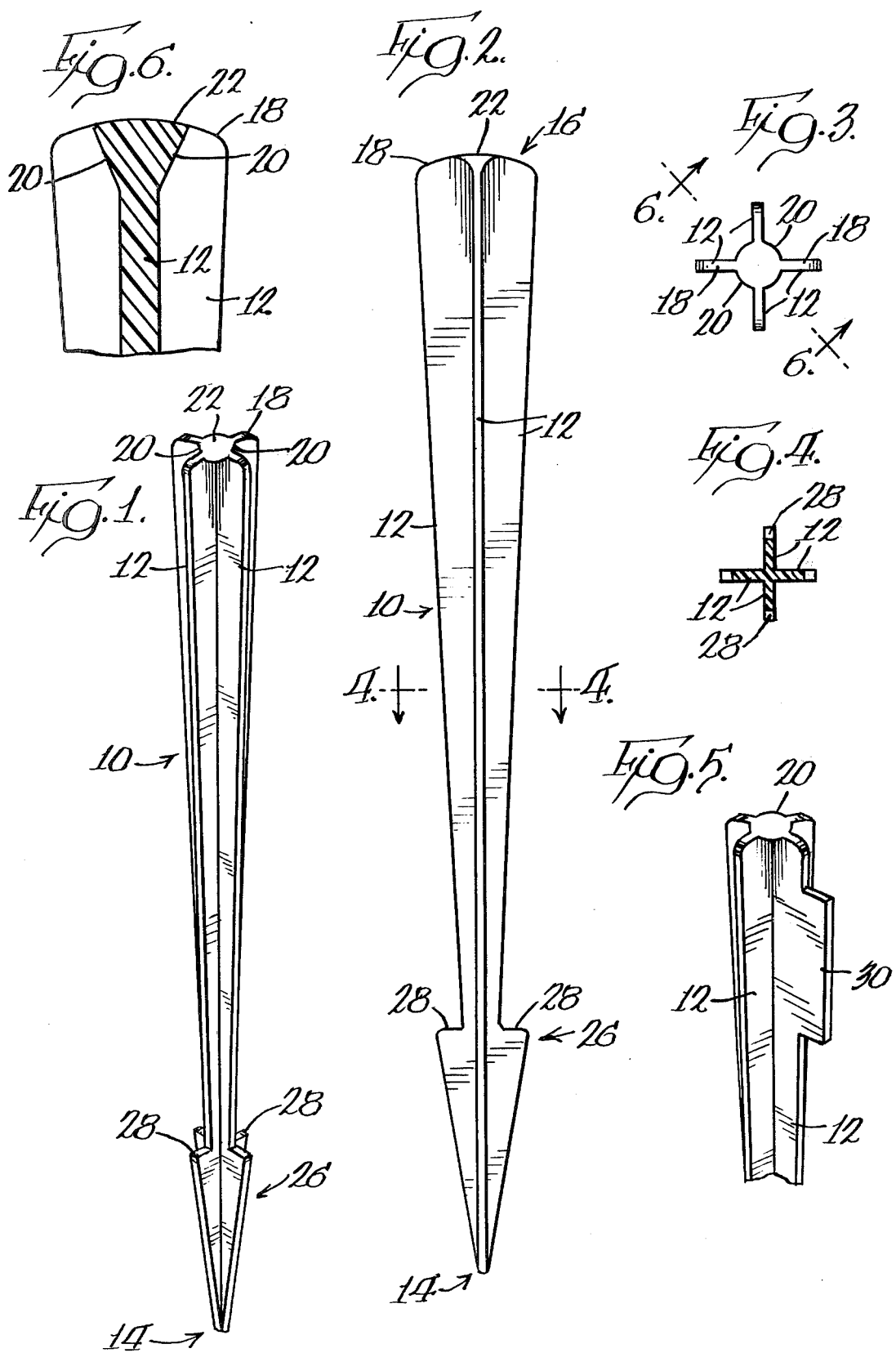

MOLDED PLASTIC STAKE

BACKGROUND OF THE INVENTION

Marking stakes are in common use today by utility companies, and those working with and around underground utility lines, to not only designate the presence and location of a utility line, but also to warn operators of excavating and earth moving equipment of the presence of such lines to prevent disruption of service to utility customers. The stakes that are in most widespread use today are wooden elements that are cut so as to have a pointed leading end for penetrating the ground. While such stakes have generally served their purpose, they have a number of drawbacks and inherent deficiencies. In this regard, typical stakes are often somewhat difficult to drive into the ground, with the result that the stakes ultimately become damaged by repeated striking with a hammer or the like. In addition to having a relatively short useful life for the aforementioned reason, once such stakes have been driven into the ground, they exhibit instability and are susceptible to ready loosening and dislodgement. For these reasons, there has been a longstanding need for an improved stake of the type described which would perform the desired function, and which is susceptible in inexpensive manufacture process.

A wide variety of different types of stakes have been proposed in the past, but such stakes have not met with commercial success for one reason or another. Examples of such stakes are shown in U.S. Pat. Nos. Des. 218,582; 1,345,111; 1,902,875; 2,154,966; 2,773,470, 3,205,626; 3,507,081; 3,754,360; and 3,788,336; and in German Patent No. 1,303,828 and German application 24 20 501 published June 11, 1975.

SUMMARY OF THE INVENTION

The stake of the present invention includes a slender, elongate body comprised of four integral webs. The product may be conveniently and inexpensively manufactured by injection molding. The webs are disposed at right angles with respect to one another, and include smooth surfaced, flat, generally parallel sides for easy passage into the ground. The webs taper inwardly from a rounded surface at the trailing end of the stake to an intermediate point adjacent the leading end of the stake, where outwardly extending projections are provided which collectively define a shoulder for resisting axial pullout of the stake from the ground. The webs taper forwardly from the outer ends of the outwardly extending portions and merge at a point at the leading end of the stake, so as to provide for easy initial penetration of the ground. It will be understood that by virtue of the web construction, once the stake has been driven into the ground, rotation and consequent loosening of the stake is effectively resisted.

Reinforcing portions preferably are provided between the webs at the trailing end of the stake, and the reinforcing portions include rounded upper surfaces which are generally disposed on the same radius as the upper ends of the webs, so that an enlarged, dome-shaped striking surface is provided centrally of the trailing end of the stake.

By virtue of its configuration, the stake of the present invention utilizes a minimum amount of material, and yet it exhibits surprising strength and impact resistance. As such, stakes constructed in accordance with the present invention are susceptible of repeated use. The stakes are preferably formed of a high-impact plastic material, such as high-impact styrene, and can be readily color-coded for marking different kinds of underground utility lines. When the stakes are in the ground, the exposed portions of the webs are readily visible, and a sighting flag can be incorporated in at least one of the webs, if the stake of the present invention is to be used as a survey stake.

BRIEF DESCRIPTION OF THE DRAWINGS

FIG. 1 is a perspective view of a stake formed in accordance with the teachings of the present invention;

FIG. 2 is a side elevational view of the stake of FIG. 1;

FIG. 3 is a top plan view of the stake of the present invention;

FIG. 4 is a cross-sectional view taken generally along line 4—4 of FIG. 2;

FIG. 5 is a fragmentary perspective view of a modified form of survey stake; and FIG. 6 is an enlarged cross-sectional view taken generally along line 6—6 of FIG. 3.

DETAILED DESCRIPTION

While this invention is susceptible of embodiment in many different forms, there is shown in the drawings and will herein be described in detail a preferred embodiment of the invention and a modification thereof, with the understanding that the present disclosure is to be considered as an exemplification of the principles of the invention and is not intended to limit the invention to the embodiments illustrated. The scope of the invention will be pointed out in the appended claims.

Referring now to the drawings, the stake of the present invention is designated in its entirety by reference numeral 10, and is defined by an integral one-piece body comprised of a plurality of slender, elongate webs 12. As is best seen in FIGS. 3 and 4, webs 12 are relatively thin, with the opposite faces thereof being disposed generally parallel with respect to one another. Stake 10 has a length dimension several times its width dimension, and includes a leading end 14 adapted to penetrate the ground, and a trailing end 16 adapted to be disposed above the ground and will be readily visible. The relatively wide trailing end of the stake provides a convenient location for a customer's logo, if such is desired.

The upper ends 18 of webs 12 are rounded, and collectively define a generally dome-shaped striking surface. Reinforcing portions 20 are provided between each of the webs 12 at the trailing end of the stake, and the reinforcing portions 20 include a rounded upper surface 22 disposed generally on the same radius of curvature as the upper ends 18 of webs 12, so that an enlarged striking surface is provided in the center of the trailing end of the stake. Reinforcing portions 20 taper inwardly and merge with the sides of the webs 12 shortly below the trailing end of the stake, as is evident from FIG. 6.

Webs 12 taper inwardly from the trailing end 18 thereof to an intermediate position 26 of the stake, with position 26 being located closer to the leading end 14 than the trailing end 18. As is evident from FIG. 2, the taper of webs 12 is uniform and constant from the trailing end 18 to the intermediate point 26. Webs 12 include outwardly extending portions 28 at intermediate point 26, which are disposed in a common plane, and which collectively define an upwardly facing shoulder for resisting pullout of the stake from the ground. As is evident from FIGS. 1 and 2, webs 12 taper inwardly from the outer ends of outwardly extending portions 28, and merge together at a point at the leading end 14 of the stake.

If desired, a rectangular projection 30 (FIG. 5) may be provided on at least one of the webs 12 adjacent the trailing end of the stake, to serve as a sighting flag for use in surveying.

Stakes as described above may be conveniently and inexpensively formed by an injection molding process. Such stakes may be color coded for identification of a particular customer, or for identification of a particular type of underground utility line. In an exemplary embodiment, the overall length of the stake is 18 inches, and the width of the stake at the trailing end 16 is 2 inches. Webs 12 taper inwardly from trailing end 16 toward intermediate location 26 at an angle of from 2° to 4°, and preferably just slightly less than 3°. In such a stake, the intermediate position 26 is located about 4 inches from the leading end 14, and the leading ends of the webs 12 are tapered at an angle greater than the trailing ends of the webs, illustratively at an angle of between 6° and 10°.

In accordance with one aspect of the present invention, the outwardly extending portions 28 at opposite sides of the stake are of equal width, while the outwardly extending portions 28 perpendicular thereto are of a different width. In one embodiment of the present invention, the dimension between the outer edges of one set of outwardly extending portions 28 may be 1.5 inches, while the dimension between the outwardly extending portions perpendicular thereto may be 1 inch. The taper of the leading end of the webs associated with said latter outwardly extending portions is at an angle of about 6°, while the taper of the outwardly extending portions perpendicular thereto is at an angle of slightly less than 10°. All of the aforementioned webs have a generally uniform thickness of about 0.15 inches. In the embodiment described above, the upper ends 18 of the webs and the upper ends of the reinforcing portions are disposed on a radius of about 2.12 inches, and the sides of reinforcing portions 20 are disposed at an angle of about 25° with respect to the axis of the stake. Domed portion 22 has a diameter of about 0.75 inches.

The aforementioned dimensions are given for purposes of example only, and should not be taken as limiting on the present invention, except to the extent that such limitations are incorporated in the appended claims.

I claim:

1. A molded plastic stake comprising: a body having a leading end adapted to penetrate the ground and a trailing end adapted to be disposed above the ground and to be readily visible, said body being comprised of a plurality of interconnected webs extending from said leding end to said trailing end, a bridging section between said webs at the trailing end of said body, said webs and said bridging sections each having a rounded upper surface and said rounded surfaces cooperating to collectively define a striking surface for driving said stake into the ground, said striking surface including a centrally disposed generally circular domed portion including the inner end of the rounded surface of each web and the upper surface of said bridging sections, said bridging sections tapering inwardly and downwardly from said striking surface to adjacent webs to provide reinforcement for said striking surface, said webs each having a length dimension that is at least several times its width dimension and tapering inwardly from said striking surface to an intermediate point located between said striking surface and said leading end, each web having an outwardly extending portion at said intermediate point disposed generally perpendicularly to the length of the stake, said outwardly extending portions cooperating to collectively define a shoulder to resist pulling of said stake out of the ground, and said webs tapering inwardly from the outer ends of said outwardly extending portions and merging at a point at said leading end of the stake.

2. A stake as set forth in claim 1 wherein the outwardly extending portions on diametrically opposed sides of the stake are equal, and wherein the outwardly extending portions at right angles with respect to one another are different, so that the taper of the alternate webs between said intermediate portions and said leading end are different.

3. A stake as set forth in claim 1 wherein opposite faces of each web are generally parallel with one another throughout a major portion of the length of the webs.

4. A stake as set forth in claim 1 wherein a generally rectangular extension is formed integrally with at least one of said webs adjacent the trailing end thereof.

5. A stake as set forth in claim 1 wherein at least some of said webs are identically shaped.

6. A stake as set forth in claim 5 wherein said body includes four webs disposed at 90° with respect to one another.

7. A stake as set forth in claim 6 wherein the taper of the webs between said intermediate portions and said leading end is greater than the taper of the webs between said trailing end and said intermediate portion.

8. A stake as set forth in claim 7 wherein said outwardly extending portions are disposed in a common plane.

* * * * *